United States Patent
Hirano

(10) Patent No.: US 9,602,698 B2
(45) Date of Patent: Mar. 21, 2017

(54) METHOD FOR CREATING A COLOR CONVERSION PROFILE FOR A PRINTER AND COMPUTER READABLE RECORDING MEDIUM STORED WITH PROGRAM FOR CREATING SAME

(71) Applicant: KONICA MINOLTA, INC., Chiyoda-ku, Tokyo (JP)

(72) Inventor: Sachiko Hirano, Hino (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 14/729,143

(22) Filed: Jun. 3, 2015

(65) Prior Publication Data
US 2015/0356388 A1 Dec. 10, 2015

(30) Foreign Application Priority Data
Jun. 6, 2014 (JP) ................... 2014-117733

(51) Int. Cl.
*G06F 3/12* (2006.01)
*H04N 1/60* (2006.01)

(52) U.S. Cl.
CPC .................... *H04N 1/6033* (2013.01)

(58) Field of Classification Search
CPC ........ H04N 1/60; H04N 1/6033; H04N 1/603; H04N 1/6052; H04N 1/6055
See application file for complete search history.

(56) References Cited

U.S. PATENT DOCUMENTS

| | | | | |
|---|---|---|---|---|
| 7,952,757 B2* | 5/2011 | Kaneko | ................ | H04N 1/6033 345/601 |
| 8,072,658 B2* | 12/2011 | Namikata | ............. | G06T 11/001 358/1.9 |
| 2002/0047848 A1* | 4/2002 | Odagiri | ................ | H04N 1/6033 345/581 |
| 2005/0071104 A1* | 3/2005 | Viturro | ..................... | G01J 3/46 702/85 |
| 2005/0206926 A1* | 9/2005 | Tsuji | .................... | H04N 1/6022 358/1.9 |
| 2006/0232805 A1* | 10/2006 | Holub | ................... | G06F 3/1267 358/1.9 |
| 2007/0030505 A1* | 2/2007 | Ito | ........................ | H04N 1/6033 358/1.9 |
| 2008/0204771 A1* | 8/2008 | Albat | ................... | H04N 1/6033 358/1.9 |
| 2012/0206743 A1* | 8/2012 | Murakami | .......... | H04N 1/6058 358/1.9 |

(Continued)

FOREIGN PATENT DOCUMENTS

JP  2001-320592 A  11/2001
JP  2005-269447 A  9/2005

*Primary Examiner* — Benjamin O Dulaney
(74) *Attorney, Agent, or Firm* — Buchanan Ingersoll & Rooney PC

(57) ABSTRACT

The profile creation method creates a color conversion profile for a printer by causing the printer to output a color chart including a plurality of patch images. The method acquires a colorimetric value of one patch image included in the color chart output by the printer and corrects the acquired colorimetric value of the one patch image according to the degree of variation in a color of the one patch image specified by data of the colorimetric value already accumulated regarding the one patch image.

18 Claims, 6 Drawing Sheets

(56) References Cited

U.S. PATENT DOCUMENTS

2015/0356387 A1* 12/2015 Hirano ............... G06K 15/1878
358/1.9
2015/0358506 A1* 12/2015 Hirano ................... B41J 29/393
358/1.9

* cited by examiner

METHOD FOR CREATING A COLOR CONVERSION PROFILE FOR A PRINTER AND COMPUTER READABLE RECORDING MEDIUM STORED WITH PROGRAM FOR CREATING SAME

CROSS-REFERENCE TO RELATED APPLICATION

This application is based on Japanese Patent Application No. 2014-117733 filed on Jun. 6, 2014, the contents of which are incorporated herein by reference.

BACKGROUND

1. Technical Field

The present invention relates to a profile creation method and a computer readable recording medium stored with a profile creation program.

2. Description of Related Art

In creating a printer profile for an electro-photographic printer, the printer is caused to output a color chart that includes patch images having colors corresponding to combinations of C (cyan), M (magenta), Y (yellow), and K (black). Then, colorimetry of each of the patch images is performed to correlate CMYK values of the each patch image with colorimetric values (such as $L^*a^*b^*$ values) thereof.

With regard to this, Japanese Unexamined Patent Application Publication No. 2001-320592 (Patent Literature 1) discloses a technique for reducing the influence of in-plane unevenness due to a printer by causing the printer to output a color chart including a plurality of correction patch images having the same color, and, based on calorimetric results of the correction patch images, correcting calorimetric values of the other patch images. In addition, Japanese Unexamined Patent Application Publication No. 2005-269447 (Patent Literature 2) discloses a technique for reducing the influence of calorimetric errors by calculating a level of reliability indicating a certainty of calorimetric results from a relationship with calorimetric values of adjacent plural patch images to correct a color conversion coefficient according to the level of reliability. These techniques can improve the accuracy of a printer profile created by colorimetry of patch images.

However, the techniques of Patent Literature 1 and 2 do not consider the influence of variation in colors (reproducibility) output by a printer. Colors output by a single printer slightly vary at each output time even in colors of the same CMYK values. In addition, colors output by a plurality of printers slightly vary in each printer even in colors of the same CMYK values output from the printers of the same model. The degree of such a color variation per output or per printer varies depending on the color to be output.

Accordingly, under the recent circumstances where there has been a desire to achieve higher precision color management, there has been a possibility that when a printer profile is created on the basis of one sheet of a color chart output by a printer, the created printer profile is rather inappropriate for colors varying in a large degree. When considering color variation per output and color variation per printer, it is preferable for a printer profile to reflect an average value (median value) of color variation.

SUMMARY

The present invention has been accomplished in view of the above problem. Accordingly, objectives of the present invention are to provide a profile creation method that can create a color conversion profile reflecting an average value of color variation and a computer readable recording medium stored with a profile creation program.

To achieve at least one of the above-mentioned objectives, a profile creation method reflecting one aspect of the present invention is a profile creation method for creating a color conversion profile for a printer by causing the printer to output a color chart including a plurality of patch images, the method including the steps of: (a) acquiring a colorimetric value of one patch image included in the color chart output by the printer; and (b) correcting the colorimetric value of the one patch image acquired at the step (a) according to a degree of variation in a color of the one patch image specified by data of the colorimetric value already accumulated regarding the one patch image, and the step (a) and the step (b) are executed for each patch image of the plurality of patch images included in the color chart.

In the profile creation method, preferably, at the step (b), the colorimetric value acquired at the step (a) is corrected by calculating a weighted average value between the colorimetric value and an approximate value calculated from colorimetric values of a plurality of other patch images included in the color chart, and a weighting factor in the calculation of the weighted average value is changed according to the degree of the variation so that as the degree of the variation is larger, a weight of the approximate value becomes larger.

In the profile creation method, preferably, the number of the other patch images is changed according to the degree of the variation so that as the degree of the variation is larger, the number of the other patch images used for the calculation of the approximate value increases.

The profile creation method preferably further includes, before the step (b), (c) calculating, from the data of the colorimetric value, standard deviations of $L^*$ value, $a^*$ value, and $b^*$ value of the colorimetric value in an $L^*a^*b^*$ color system; and (d) specifying the degree of the variation on the basis of the standard deviations calculated at the step (c).

In the profile creation method, preferably, at the step (b), colorimetric values of the plurality of patch images are corrected in a sequential order of colorimetric values of colors corresponding to vertices, colorimetric values of colors corresponding to ridgelines, colorimetric values of colors corresponding to a surface other than the ridgelines, and colorimetric values of colors corresponding to an inside of a color space whose axis variables are represented by basic colors.

In the profile creation method, preferably, at the step (b), regarding colorimetric values to be corrected in the same sequential order, correction is preferentially performed on an array of colors where a value of a basic color whose monochromatic solid image has lower brightness gradually changes.

The objectives, features, and characteristics of this invention other than those set forth above will become apparent from the description given herein below with reference to preferred embodiments illustrated in the accompanying drawings.

DETAILED DESCRIPTION

Hereinafter, preferred embodiments of the present invention will be described with reference to the accompanying drawings.

Figure 1:
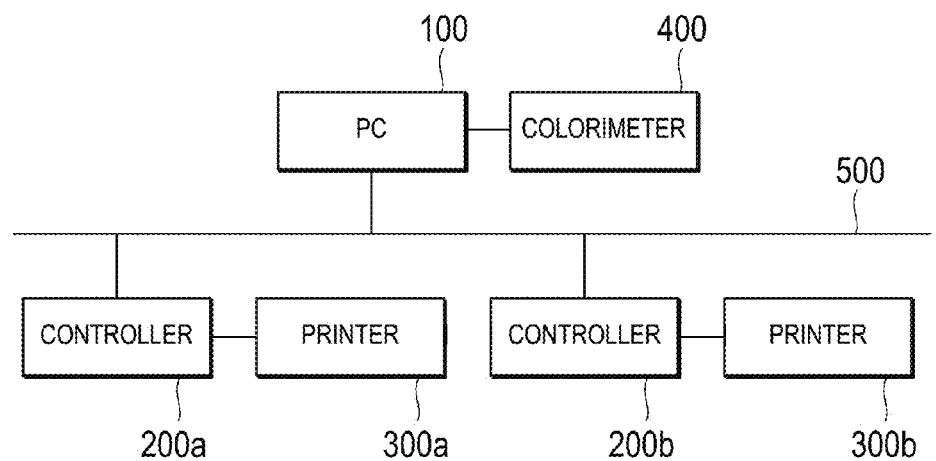
FIG. 1 is a block diagram showing a whole structure of a print system to which a profile creation method according to an embodiment of the present invention is applied.

FIG. 1 is a block diagram showing a whole structure of a print system to which a profile creation method according to an embodiment of the present invention is applied.

As shown in FIG. 1, the print system includes a PC (personal computer) 100, controllers 200a and 200b, printers 300a and 300b, and a colorimeter 400. The PC 100 is communicably connected to the controllers 200a and 200b via a network 500. The controllers 200a and 200b, respectively, are connected to the printers 300a and 300b, respectively, for example, via an exclusive interface bus such as an IEEE1394 serial bus or a USB (universal serial bus). The PC 100 is connected to the colorimeter 400 via an exclusive line. The controllers 200a and 200b are the same model of controller, and also the printers 300a and 300b are the same model of printer.

The network 500 is a LAN (local area network) connecting computers or network devices to each other by a standard such as Ethernet, FDDI (fiber distributed data interface), or Wi-Fi (wireless fidelity), a WAN (wide area network) connecting LANs to each other by an exclusive line, or the like. The kinds and numbers of the devices connected to the network 500 are not limited to those in the example shown in FIG. 1.

Figure 2:
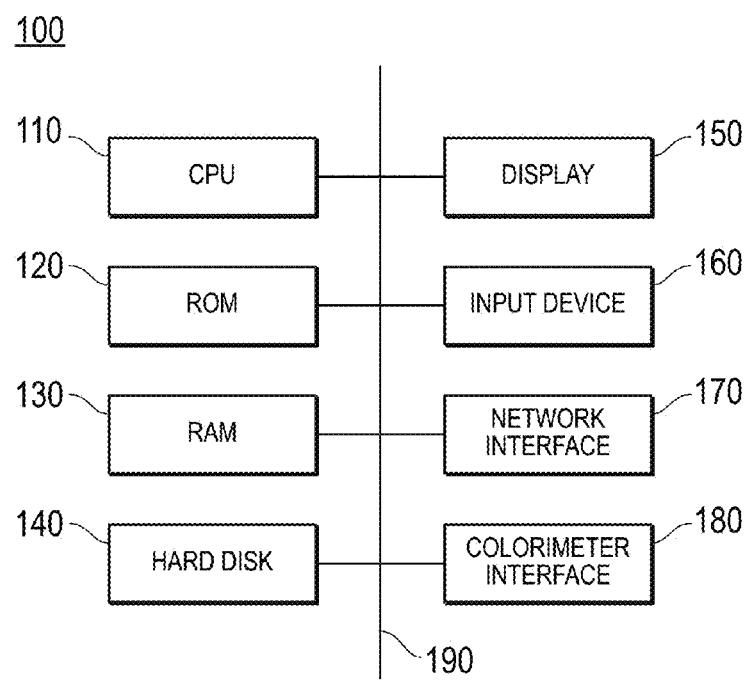
FIG. 2 is a block diagram showing a schematic structure of a PC.

FIG. 2 is a block diagram showing a schematic structure of the PC 100. The PC 100 includes a CPU (central processing unit) 110, a ROM (read only memory) 120, a RAM (random access memory) 130, a hard disk 140, a display 150, an input device 160, a network interface 170, and a colorimeter interface 180, which are connected to each other via a bus 190 for receiving and transmitting signals.

The CPU 110 controls the above respective units and performs various kinds of calculation processes according to programs. The ROM 120 stores various kinds of programs and various kinds of data. The RAM 130 as a work area temporarily stores a program and data. The hard disk 140 stores various kinds of programs including an operating system (OS) and various kinds of data.

The display 150 is, for example, a liquid crystal display and displays various kinds of information. The input device 160 includes a pointing device such as a mouse and a keyboard and is used to perform various kinds of inputting operations. The network interface 170 is an interface for communicating with other devices via the network 500, and a standard such as Ethernet, FDDI, or Wi-Fi is used.

The colorimeter interface 180 is an interface for communicating with the locally connected colorimeter 400. The colorimeter 400 is, for example, a spectrophotometer provided with three kinds of sensors corresponding to the three primary colors of light: red, green, and blue and a spectroscopic sensor for performing colorimetry on the basis of output values (RGB values) from the three kinds of sensors with respect to respective parts of a color image.

Figure 3:
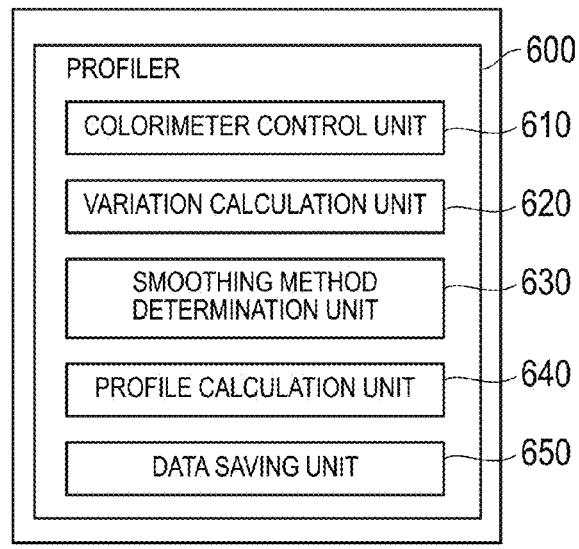
FIG. 3 is a block diagram showing storage contents of a hard disk of the PC.

FIG. 3 is a block diagram showing storage contents of the hard disk 140 of the PC 100.

The hard disk 140 of the PC 100 stores a profiler 600 as a profile creation program. The profiler 600 includes programs corresponding to a colorimeter control unit 610, a variation calculation unit 620, a smoothing method determination unit 630, a profile calculation unit 640, and a data saving unit 650.

The colorimeter control unit 610 controls operation of the colorimeter 400. The variation calculation unit 620 calculates a degree of color variation of each patch image from data of colorimetric value accumulated regarding the each patch image. The smoothing method determination unit 630 determines a smoothing method for calorimetric values of the each patch image according to the degree of the color variation. The profile calculation unit 640 creates a printer profile by performing a smoothing process on the calorimetric values of the each patch image. The data saving unit 650 stores data such as the calorimetric values. The functions of the colorimeter control unit 610, the variation calculation unit 620, the smoothing method determination unit 630, the profile calculation unit 640, and the data saving unit 650 are exerted through the executions of programs corresponding to the respective functions by the CPU 110.

Figure 4:
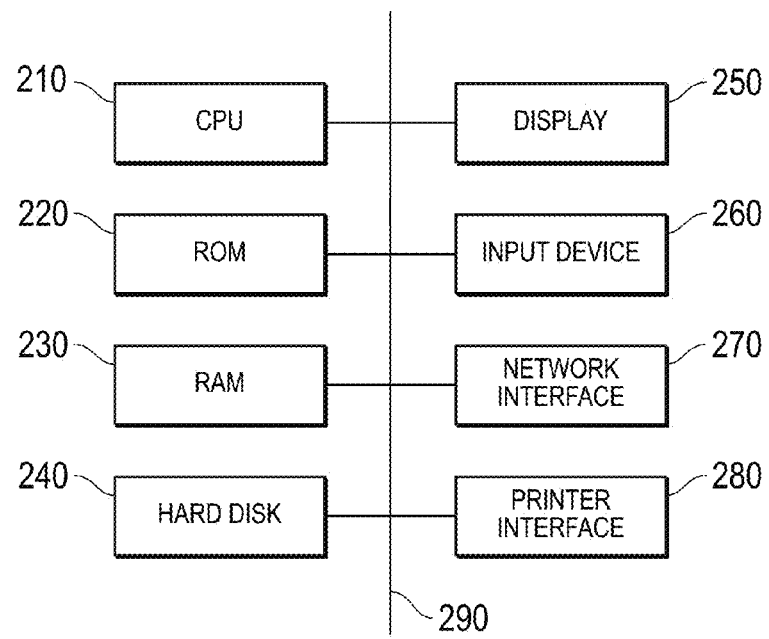
FIG. 4 is a block diagram showing a schematic structure of a controller.

FIG. 4 is a block diagram showing a schematic structure of the controllers 200a and 200b. Since the controllers 200a and 200b are the same model of controller, the controller 200a will be described as a representative one hereinbelow.

The controller 200a includes a CPU 210, a ROM 220, a RAM 230, a hard disk 240, a display 250, an input device 260, a network interface 270, and a printer interface 280, which are connected to each other via a bus 290 for receiving and transmitting signals. Among the above-described respective units of the controller 200a, the units having the same functions as those of the above-described respective units of the PC 100 are not be described herein.

The printer interface 280 is an interface for communicating with the locally connected printer 300a.

The hard disk 240 stores a color conversion LUT (look-up table) of an ICC (International Color Consortium) printer profile or the like. Additionally, the hard disk 240 stores a RIP process program for converting CMYK values of each pixel by using the color conversion LUT while developing print data described in a page description language into bit map image data.

Figure 5:
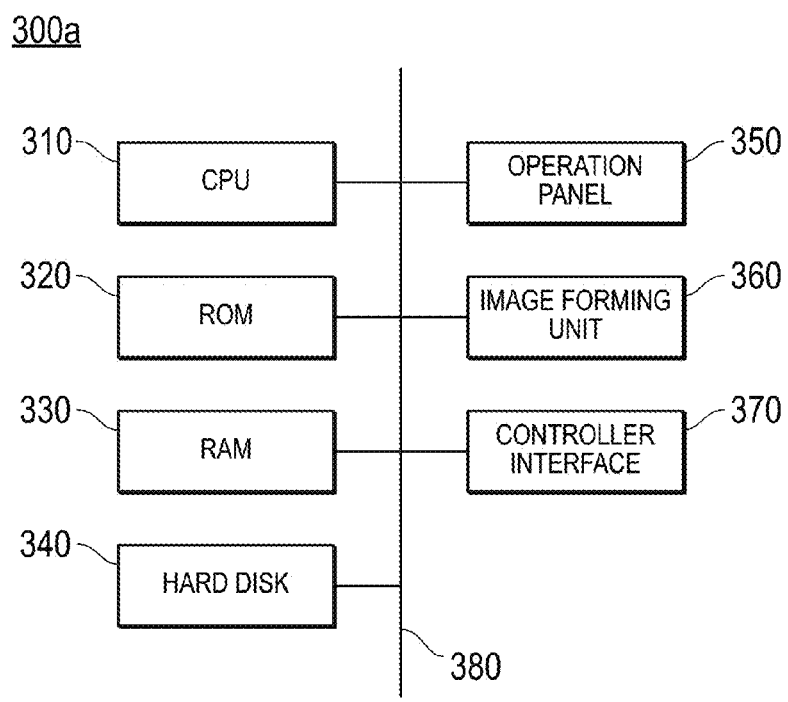
FIG. 5 is a block diagram showing a schematic structure of a printer.

FIG. 5 is a block diagram showing a schematic structure of the printers 300a and 300b. Since the printers 300a and 300b are the same model of printer, the printer 300a will be described as a representative one hereinbelow.

The printer 300a includes a CPU 310, a ROM 320, a RAM 330, a hard disk 340, an operation panel 350, an image forming unit 360, and a controller interface 370, which are connected to each other via a bus 380 for receiving and transmitting signals. Among the above-described respective units of the printer 300a, the units having the same functions as those of the above-described respective units of the PC 100 are not be described herein.

The operation panel 350 is used to display various kinds of information and input various kinds of commands. The image forming unit 360 forms an image based on image data received from the controller 200a on a record sheet such as paper by using a known image forming process such as an electro-photographic process. The image forming unit 360 forms an image using toners of four basic colors, i.e., C, M, Y, and K.

The controller interface 370 is an interface for communicating with the locally connected controller 200a.

The PC 100, the controllers 200a and 200b, and the printers 300a and 300b may include elements other than the above-described elements or may omit some of the above-described elements.

In the print system thus configured, a printer profile is created by causing a printer to output a color chart and correlating CMYK values of each patch image with colorimetric values thereof. In this case, the colorimetric values of the each patch image are corrected according to a degree of each color variation specified by data of colorimetric values already accumulated regarding the each patch image. Hereinafter, a description will be given of operation of the print system according to the present embodiment with reference to FIGS. 6 to 9. The following description illustrates an exemplary case of creation of a printer profile reflecting color variation per printer output.

Figure 6:
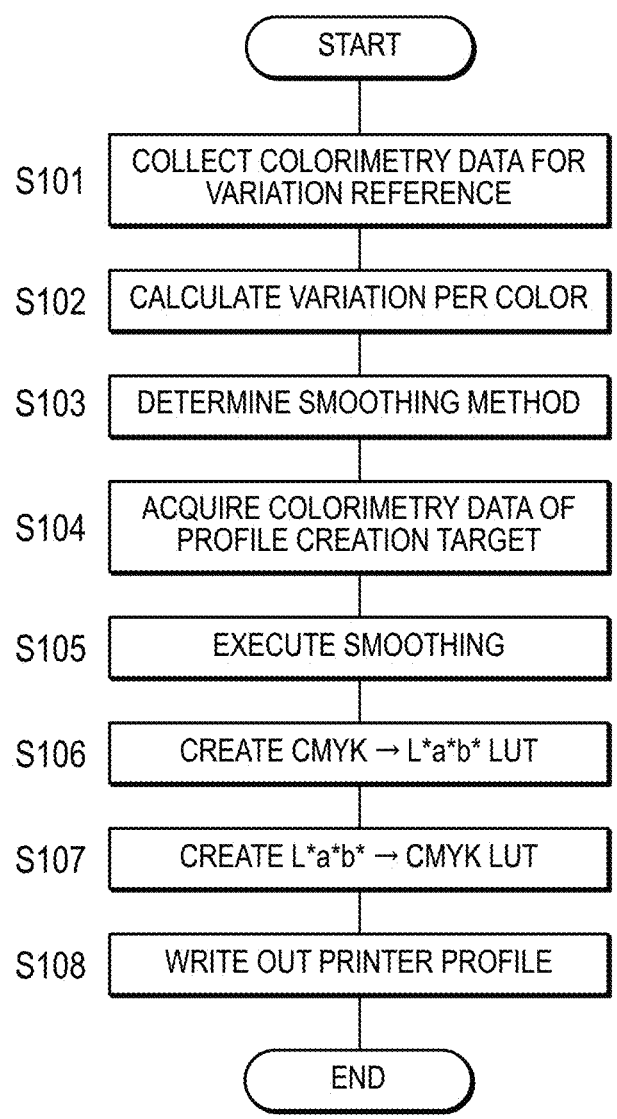
FIG. 6 is a flowchart showing steps of a profile creation process executed by the PC.

FIG. 6 is a flowchart showing steps of a profile creation process executed by the PC 100. The algorithm represented by the flowchart of FIG. 6 is stored as a program in the hard disk 140 of the PC 100 and executed by the CPU 110.

First, the PC 100 collects colorimetry data for variation reference (step S101). Specifically, first, the PC 100 transmits a print job to the controller 200a to cause the printer 300a to output a plurality of sheets (for example, 30 sheets) of the same color chart 700 (see FIG. 7). Then, the PC 100 acquires colorimetric values (for example, L*a*b* values) obtained by colorimetry of patch images in the plurality of sheets of the color chart 700 performed by the colorimeter 400 and saves the colorimetric values in the data saving unit 650 of the hard disk 140.

Figure 7:
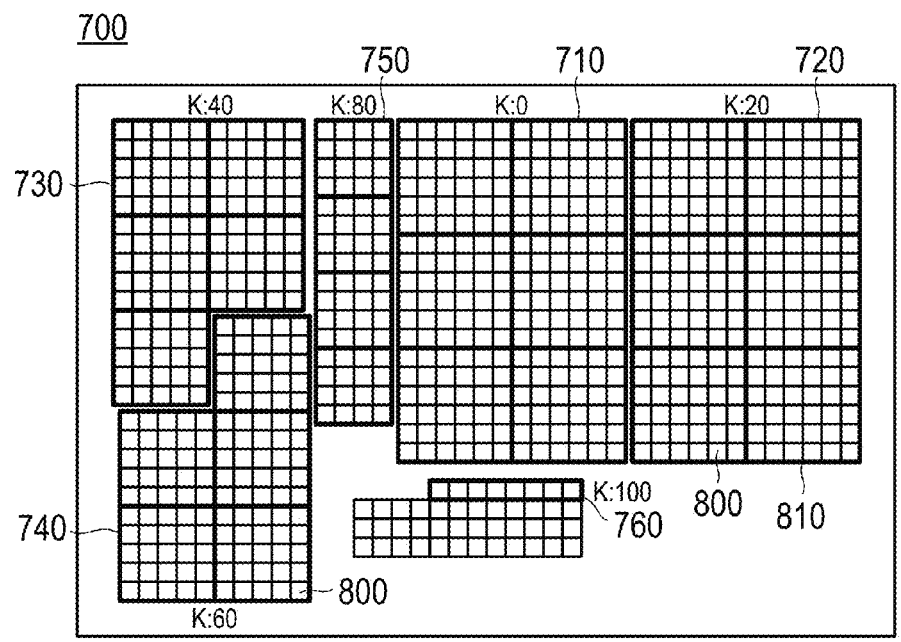
FIG. 7 is a diagram showing an example of a color chart.
Figure 8:
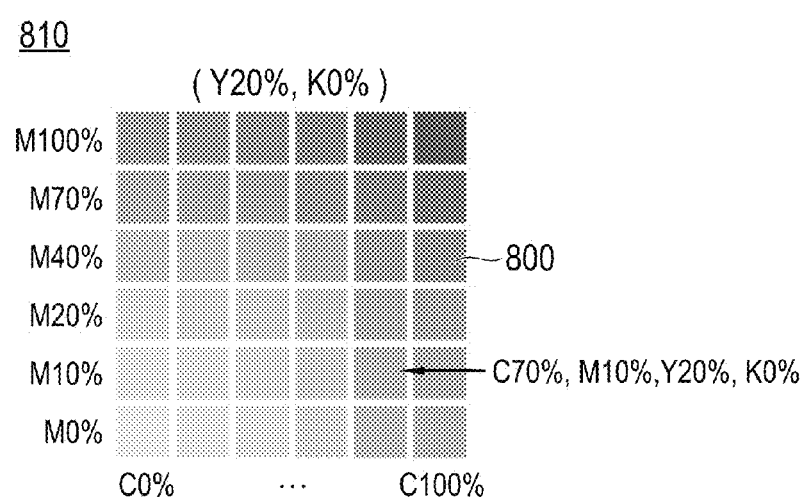
FIG. 8 is a partially enlarged diagram of FIG. 7.

FIG. 7 is a diagram showing an example of the color chart 700, and FIG. 8 is a partially enlarged diagram of FIG. 7. As shown in FIG. 7, the color chart 700 includes patch images 800 having colors corresponding to combinations of CMYK values. In FIG. 7, the patch images 800 in one sheet of color chart 700 are classified into six patch image groups 710 to 760 by K values (K: 0, 20, 40, 60, 80, and 100%).

Then, the patch image groups 710 and 720 of K: 0% and 20% each include 216 (6×6×6) patch images 800 corresponding to combinations of C, M, and Y each: 0, 10, 20, 40, 70, and 100%. The 216 patch images 800 are classified into six patch image blocks 810 by Y values. Then, as shown in FIG. 8, each patch image block 810 has a structure in which 36 (6×6) patch images 800 are two-dimensionally arranged in such a manner that M value and C value gradually change.

Similarly, the patch image groups 730 and 740 of K: 40% and 60% each include 125 (5×5×5) patch images 800 corresponding to combinations of C, M, and Y each: 0, 20, 40, 70, and 100%. The 125 patch images 800 are classified into five patch image blocks 810 by Y values. In addition, a patch image group 750 of K: 80% includes 64 (4×4×4) patch images 800 corresponding to combinations of C, M, and Y each: 0, 40, 70, and 100%, and the 64 patch images 800 are classified into four patch image blocks 810 by Y values. Additionally, a patch image group 760 of K: 100% includes 8 (2×2×2) patch images 800 corresponding to combinations of C, M, and Y each: 0% and 100%.

As described hereinabove, in the process shown at the step S101, the printer 300a is caused to output, for example, the 30 sheets of the same color chart 700. The 30 sheets of the color chart 700 are preferably output by the printer 300a, while changing environmental temperature and humidity or changing an output condition so that each sheet thereof is a first page output immediately after pausing or one output during continuous operation. Then, all of the patch images 800 in the 30 sheets of the color chart 700 output from the printer 300a are subjected to colorimetry by the colorimeter 400. The PC 100 acquires 30 sets of calorimetric values per patch image and saves data of the calorimetric values in the hard disk 140.

Next, the PC 100 calculates a degree of each color variation (step S102). Specifically, based on the data of the colorimetric values collected in the process shown at the step S101, the PC 100 calculates a degree of variation regarding a color of each patch image (CMYK values) included in the color chart 700.

More specifically, first, the PC 100 calculates each of standard deviations of the L*values, the a*values, and the b*values of the 30 sets of calorimetric values regarding the color of each patch image, from the data of the 30 sets of calorimetric values collected per patch image by the process shown at the step S101. Subsequently, the PC 100 weights the standard deviation of the L* values by 0.5 times against the standard deviations of the a* values and the b* values to obtain a sum of three standard deviations. Then, the PC 100 refers to a predetermined threshold value and, based on the sum of the standard deviations, the degree of each color variation of the patch images 800 is classified into three levels of "a", "b", and "c".

In the present embodiment, when the sum of the standard deviations is less than 1.0, the degree of variation is classified as "a". In addition, when the sum of the standard deviation is not less than 1.0 and less than 3.0, the degree of variation is classified as "b". When the sum of the standard deviation is not less than 3.0, the degree of variation is classified as "c". For example, when all of the standard deviations of the L* values, the a* values, and the b* values of the accumulated 30 sets of colorimetric values regarding one patch image 800 in the color charts 700 are 1, the sum of the standard deviations is 2.5 and the degree of variation is classified as "b". In the calculation of the sum of the standard deviations of the L* values, the a* values, and the b* values, weighting the L* values by a small factor allows accuracy and robustness of the a* values and the b* values to be more improved than the L* values, thereby allowing the creation of a printer profile excellent in visual color reproducibility.

Next, the PC 100 determines a smoothing method (step S103). Specifically, the PC 100 determines, for each patch image, a smoothing method for the colorimetric values of the patch image from the degree of the variation calculated by the process shown at the step S102. More specifically, the PC 100 determines the smoothing method for the colorimetric values in such a manner that smoothness is prioritized in colors with a large degree of variation and reproduction accuracy is prioritized in colors with a small degree of variation.

In the present embodiment, the PC 100 refers to a conversion table (see Table 1) showing a relationship between degree of variation, weighting factor of colorimetric values, and number of neighboring points for approximate value calculation to determine, for each patch image, a weighting factor of colorimetric values and the number of neighboring points for approximate value calculation to be applied to a colorimetric value smoothing process from the degree of the variation calculated by the process shown at the step S102.

TABLE 1

| Degree of variation | Weight of colorimetric values | Number of neighboring points |
|---|---|---|
| a | 0.95 | 2 |
| b | 0.6 | 4 |
| c | 0.3 | 6 |

Table 1 shows an example of the conversion table showing the relationship between degree of color variation, weighting factor of colorimetric values, and number of neighboring points for approximate value calculation. As shown in Table 1, the PC 100 determines, for each patch image, the weighting factor of colorimetric values and the number of neighboring points for approximate value calculation from the degree of the variation calculated by the process shown at the step S102 so that as the degree of the variation becomes larger, the weighting factor of the colorimetric values becomes smaller and the number of the neighboring points for approximate value calculation increases.

As described above, in the processes shown at the steps S101 to S103, the printer 300a is caused to output the plurality of sheets of the color chart 700 to accumulate the data of the colorimetric values regarding each patch image 800. Then, from the data of the colorimetric values accumulated regarding the each patch image 800, the degree of variation in the color of each patch image is specified, and a colorimetric value smoothing method corresponding to the degree of the variation is determined for each patch image.

Next, the PC 100 acquires colorimetry data of a profile creation target (step S104). Specifically, the PC 100 transmits a print job to the controller 200b to cause the printer 300b to output one sheet of the color chart 700. Then, the PC 100 acquires colorimetric values (L*a*b* values) obtained by colorimetry of the patch images 800 in the color chart 700 by the colorimeter 400.

Next, the PC 100 executes a smoothing process for the colorimetric values (step S105). Specifically, the PC 100 corrects the colorimetric values acquired by the process shown at the step S104 through the smoothing method determined by the process shown at the step S103. More specifically, the PC 100 corrects the colorimetric values acquired by the process shown at the step S104 by applying the weighting factor of the colorimetric values and the number of neighboring points for approximate value calculation determined by the process shown at the step S103.

In the present embodiment, the PC 100, first, calculates approximate values of the colorimetric values of a correction target. Specifically, the PC 100 performs interpolation or extrapolation calculation of the calorimetric values of the correction target by using the same number of colorimetric values of other patch images as the number of the neighboring points determined by the process shown at the step S103 to calculate approximate values of the colorimetric values of the correction target. More specifically, regarding an array of patch images where a value of one basic color has gradually changed from among CMYK values of patch images corresponding to the colorimetric values of the correction target, the PC 100 uses colorimetric values of the same number of patch images arranged before and after the patch images corresponding to the colorimetric values of the correction target or uses the colorimetric values of the patch images arranged either therebefore or thereafter, thereby calculating approximate values of the colorimetric values of the correction target. Here, when there is a shortage of colorimetric values usable with respect to the number of the neighboring points for approximate value calculation determined by the process shown at the step S103, the PC 100 calculates approximate values using only usable colorimetric values. For example, when the number of neighboring points determined by the process shown at the step S103 is six but the number of neighboring colorimetric values is only five, the PC 100 calculates approximate values using the five colorimetric values. The technique for calculating approximate values of the colorimetric values of one patch image by interpolation calculation using the colorimetric values of other patch images is a typical interpolation calculation technique, and thus, a description thereof will be omitted.

After calculating the approximate values of the colorimetric values of the correction target, the PC 100 calculates weighted average values between the colorimetric values of the correction target and the approximate values thereof by applying a weighting factor determined by the process shown at the step S103 to correct the colorimetric values. For example, when the weighting factor determined by the process shown at the step S103 is 0.6, the PC 100 calculates, as colorimetric values after correction, sums of values obtained by multiplying the calorimetric values of the correction target by 0.6 and values obtained by multiplying the approximate values by 0.4.

In the present embodiment, the PC 100 corrects colorimetric values of all the patch images 800 included in the color chart 700. In this case, the PC 100 corrects the colorimetric values in a sequential order of colors corresponding to vertices, colors corresponding to ridgelines, colors corresponding to a surface other than the ridgelines, and colors corresponding to an inside in a CMYK color space whose axis variables are represented by C, M, Y, and K. Specifically, for example, first, regarding patch images having the colors corresponding to the vertices (where CMYK are all 0 or 100%) of the CMYK color space, the PC 100 corrects colorimetric values of each patch image. Next, regarding K: 0 and 100%, the PC 100 corrects colorimetric values of patch images having the colors corresponding to the ridgelines of the CMY color space, and then, regarding K: 20, 40, 60, and 80%, the PC 100 corrects the colorimetric values of the patch images having the colors corresponding to the ridgelines of the CMY color space. Then, similarly, regarding K: 0 and 100%, the PC 100 corrects colorimetric values of patch images having the colors corresponding to the surface of the CMY color space, and then, regarding K: 20%, 40%, 60%, and 80%, the PC 100 corrects the colorimetric values of the patch images having the colors corresponding to the surface of the CMY color space. Furthermore, similarly, regarding K: 0% and 100%, the PC 100 corrects colorimetric values of patch images having the colors corresponding to the inside of the CMY color space, and then, regarding K: 20%, 40%, 60%, and 80%, the PC 100 corrects the colorimetric values of the patch images having the colors corresponding to the inside of the CMY color space. With this configuration, the colorimetric values are sequentially corrected starting from colors that seem to be highly stable in terms of an image forming process. Accordingly, the colorimetric values of the other colors are corrected on the basis of the colorimetric values of the colors that seem more accurate. Thus, inappropriate results are rarely obtainable.

Furthermore, within the respective categories of the vertices, ridgelines, surface, and inside of the CMYK color space, it is preferable to preferentially correct the colorimetric values of an array of colors where the value of a basic color whose monochromatic solid image has lower brightness (solid brightness) changes. Specifically, for example, the colorimetric values are preferably corrected in a priority order of K, C, M, and Y. With this configuration, since the colorimetric values are sequentially corrected starting from a color that greatly contributes to change in color value, continuity in arrays of color values can be easily maintained.

Taking an example of the patch image block 810 of FIG. 8, for example, correction is first performed on the calorimetric values of a patch image 800 with C: 0%, M: 100%, Y: 20%, and K: 0% on an upper left side. Then, since C has lower solid brightness than M, correction is preferentially performed on the calorimetric values of a patch image 800 on a right side thereof where the C value changes: C 10%, M 100%, Y 20%, and K 0%, rather than the colorimetric values of a patch image 800 on a lower side thereof where the M value changes: C 0%, M 70%, Y 20%, and K 0%.

As described above, in the process shown at the step S105, the colorimetric values of each patch image 800 included in the color chart 700 are corrected according to the degree of the color variation.

Next, the PC 100 creates a CMYK→L*a*b* color conversion LUT (step S106). Specifically, the PC 100 creates the CMYK→L*a*b* color conversion LUT (an A2B table) on the basis of the colorimetric values corrected by the process shown at the step S105. In this case, the PC 100 creates, for example, a color conversion LUT with 5% increments for each of CMYK by performing interpolation calculation. The technique itself for creating a CMYK→L*a*b* color conversion LUT from CMYK values and colorimetric values of patch images is a typical color conversion LUT creation technique, and thus, a detailed description thereof will be omitted.

Next, the PC 100 creates a L*a*b*→CMYK color conversion LUT (step S107). Specifically, the PC 100 creates the L*a*b*→CMYK color conversion LUT (a B2A table) from the CMYK→L*a*b* color conversion LUT created by the process shown at the step S106. The technique itself for creating a L*a*b*→CMYK color conversion LUT from a CMYK→L*a*b* color conversion LUT is also a typical color conversion LUT creation technique, and thus, a detailed description thereof will be omitted.

Then, the PC 100 writes out a printer profile in a predetermined format (step S108) and ends the process. Specifically, the PC 100 writes out the CMYK→L*a*b* color conversion LUT created by the process shown at the step S106 and the L*a*b*→CMYK color conversion LUT created by the process shown at the step S107 in a format conforming to the ICC specification into the data saving unit 650 of the hard disk 140 and ends the process. The printer profile written out into the data saving unit 650 is transmitted to the controller 200b and applied to a color conversion process of image data.

As described above, in the process of the flowchart shown in FIG. 6, first, the printer 300a is caused to output the plurality of sheets of the color chart 700 to accumulate the data of colorimetric values. Then, the data of the accumulated colorimetric values allows the specification of the degree of color variation per output of each patch image. After that, the printer 300b is caused to output only one sheet of the color chart 700 to acquire the colorimetric values of the patch images 800. Then, the colorimetric values are corrected according to the degree of the color variation specified by the data of the accumulated colorimetric values, thereby creating a printer profile for the printer 300b. With this configuration, the printer 300b is caused to output one sheet of the color chart 700, thereby allowing the creation of a printer profile reflecting an average value of variation per output of each color.

Even when a third printer of the same model as the printers 300a and 300b is located on the network 500, the data of the calorimetric values in the printer 300a can be used, whereby the third printer is caused to output one sheet of the color chart to similarly allow the creation of a printer profile reflecting an average value of variation per output of each color.

Figure 9:
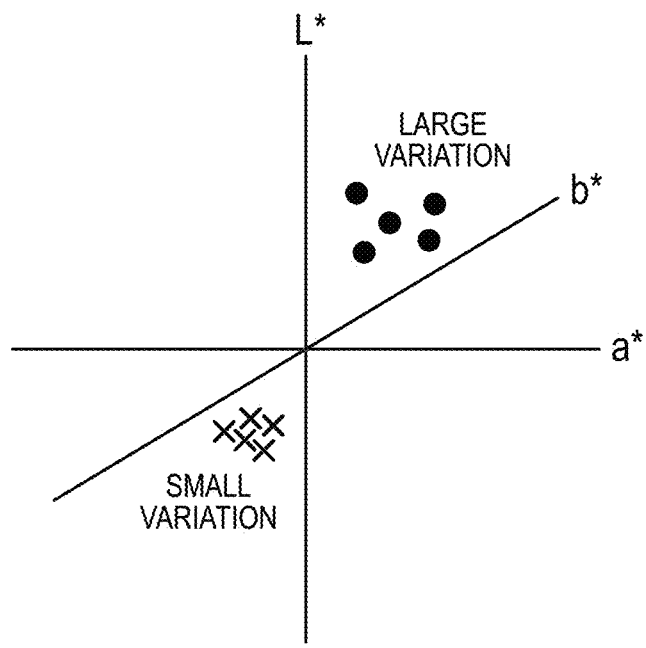
FIG. 9 is a diagram for illustrating the degrees of color variation.

FIG. 9 is a diagram for illustrating the degrees of color variation in an L*a*b* color space. In FIG. 9, five points indicated by circles represent calorimetric values of each patch image in a case where patch images having a color corresponding to first CMYK values were output five times. Similarly, five points indicated by crosses represent calorimetric values of each patch image in a case where patch images having a color corresponding to second CMYK values were output five times.

As shown in FIG. 9, the colorimetric values of the patch images having the color corresponding to the first CMYK values are distributed in a wider range than the colorimetric values of the patch images having the color corresponding to the second CMYK values. In other words, the color corresponding to the first CMYK values varies in a larger degree in each output than the color corresponding to the second CMYK values.

In the present embodiment, colorimetric values are corrected in such a manner that smoothness is prioritized in colors with a large degree of variation and reproduction accuracy is prioritized in colors with a small degree of variation. With this configuration, an average value of color variation per output can be reflected in a printer profile while leaving color characteristics specific to the printer 300b.

As described above, in the present embodiment, accumulating the data of the colorimetric values of the patch images allows the creation of a printer profile reflecting an average value of color variation per output merely by causing the printer 300b to output one sheet of the color chart.

Alternatively, the printer profile reflecting an average value of color variation per output can be created by causing the printer 300b to output a plurality of sheets of the same color chart and obtaining an average value of colorimetric values for each patch image or creating a plurality of profiles from a plurality of sheets of the color chart to select a most suitable one. However, when there is a limitation to the number of sheets of the color chart that can be output from the printer 300b, the above technique is not preferable since a high precision printer profile cannot be created.

As described above, the above embodiment has illustrated the case of creating a printer profile reflecting color variation per output from the printer. Now, hereinbelow, a description will be given of a case of creating a printer profile reflecting color variation per printer.

When creating a printer profile reflecting color variation per printer, data of colorimetric values accumulated by causing a plurality of printers to output color charts is used.

Specifically, for example, when creating a printer profile for an only one printer of a model C, 30 printers of a model B structurally similar to the model C are caused to output each one sheet of a color chart. Then, the degree of variation per color is specified from data of colorimetric values per patch image. After that, the printer of the model C is caused to output one sheet of a color chart, and colorimetric values of the patch images are corrected according to the degree of variation. In this manner, an average value of color variation per printer can be reflected in a printer profile while leaving color characteristics specific to the model C. In addition, in this case, the colorimetric values may be weighted using, as an additional factor, a degree of structural similarity associated with color reproducibility in the models B and C.

As described above, accumulating the data of the colorimetric values of each patch image in the plurality of color charts output from the plurality of printers of the model B allows a printer profile (for example, a manufacturer-provided profile) for all printers of the model C that reflects variation in individual differences of the similar model to be created merely by causing a single printer of the model C to output one sheet of the color chart.

Causes of the color variation seem to be individual difference between the printers, change due to replacement of parts, density fluctuation in engine (temperature and humidity, continuous operation time, etc.), random in-plane unevenness, and the like. Additionally, as for tendencies in color variation, colors near solid parts tend to vary in a small degree, whereas colors in a region ranging from a highlight part to a halftone part tend to vary in a large degree. Furthermore, monochromatic colors tend to vary in a small degree, whereas mixture colors of three colors: C, M, and Y tend to vary in a large degree.

The present invention is not limited only to the embodiments described above, and various modifications can be made within the scope of the claims.

For example, in the above-described embodiments, when correcting the colorimetric values, both the number of the other patch images used for approximate value calculation and the weighting factor used for calculation of the weighted average values between the colorimetric values and the approximate values have been changed according to the degree of color variation. However, when correcting the colorimetric values, one of the number of the other patch images and the weighting factor may be changed according to the degree of color variation.

Additionally, in the above-described embodiments, the standard deviations of the colorimetric values: L* values, a* values, and b* values have been calculated to specify the degrees of color variation in the patch images. However, the degrees of the variation may be specified by calculating dispersions of the colorimetric values: L* values, a* values, and b* values or calculating differences between maximum values and minimum values in the respective colorimetric values.

Additionally, in the above-described embodiments, in terms of facilitation of setting, a threshold value with respect to the sum of the standard deviations of the L* values, the a* values, and the b* values has been set and, based on the threshold value, the degree of variation has been classified into three levels. However, the standard deviations and the degree of variation may be correlated with each other by a function. This configuration allows the degree of variation to be continuously changed.

Additionally, in the above-described embodiments, the degree of color variation has been specified by comparing the sum of the standard deviations of the L* values, the a* values, and the b* values with the invariably constant threshold value. However, the threshold value may be dynamically changed by CMYK values. For example, in a case where K is less than 80, when the sum of the standard deviations is less than 1.0, the degree of variation is classified as "a". On the other hand, in a case where K is not less than 80, when the sum of the standard deviations is less than 1.5, the degree of variation is classified as "a".

Additionally, in the above-described embodiments, the plurality of printers have been caused to output the same color chart. However, the color chart to be output by the plurality of printers does not have to be the same and can be any color chart as long as it includes patch images with the same CMYK values.

Additionally, in the above-described embodiments, the L*a*b* color system has been used as a device-independent color space. However, the color system of the device-independent color space is not limited to the L*a*b* color system and may be an XYZ color system, CIECAM02, or the like.

Additionally, in the above-describe embodiments, the data of the colorimetric values and the like have been saved in the hard disk of the PC. However, the data of the colorimetric values and the like may be saved in a server outside the PC.

Additionally, in the above-described embodiments, the colorimeter as an independent device has been connected to the PC via the exclusive line. However, the colorimeter may be incorporated in the printer.

Additionally, in the above-described embodiments, the controller has been provided separately from the printer. However, the controller may be incorporated in the printer.

The units and the methods for performing the various kinds of processes in the print system according to the above-described embodiment can be achieved by either an exclusive hardware circuit or a programmed computer. The program may be provided, for example, by a computer readable recording medium such as a flexible disk or a CD-ROM, or may be provided online through a network such as the Internet. In this case, the program recorded in the computer readable recording medium is usually transferred and stored into a storage unit such as the hard disk. In addition, the program may be provided as independent application software or may be incorporated, as one function of the print system, into software of the device.

What is claimed is:

1. A profile creation method for creating a color conversion profile for a printer by causing the printer to output a color chart including a plurality of patch images, the method comprising the steps of:
    (a) acquiring a colorimetric value of one patch image included in the color chart output by the printer; and
    (b) correcting the colorimetric value of the one patch image acquired at the step (a) based on a degree of variation determined about previously accumulated colorimetric values of patch images corresponding to the one patch image, each of the patch images being a patch image of a respective one of a plurality of previously printed color charts, wherein
    the step (a) and the step (b) are executed for each patch image of the plurality of patch images included in the color chart.

2. The profile creation method as claimed in claim 1, wherein
    at the step (b), the colorimetric value acquired at the step (a) is corrected by calculating a weighted average value between the colorimetric value and an approximate value calculated from colorimetric values of a plurality of other patch images included in the color chart; and
    a weighting factor in the calculation of the weighted average value is changed according to the degree of the variation so that as the degree of the variation is larger, a weight of the approximate value becomes larger.

3. The profile creation method as claimed in claim 2, wherein
    a number of the other patch images is changed according to the degree of the variation so that as the degree of the variation is larger, the number of the other patch images used for the calculation of the approximate value increases.

4. The profile creation method as claimed in claim 1, further comprising, before the step (b):
(c) calculating, from the previously accumulated colorimetric values, standard deviations of L* value, a* value, and b* value of the previously accumulated colorimetric values in an L*a*b* color system; and
(d) specifying the degree of the variation on the basis of the standard deviations calculated at the step (c).

5. The profile creation method as claimed in claim 1, wherein
at the step (b), colorimetric values of the plurality of patch images are corrected in a sequential order of colorimetric values of colors corresponding to vertices, colorimetric values of colors corresponding to ridgelines, colorimetric values of colors corresponding to a surface other than the ridgelines, and colorimetric values of colors corresponding to an inside of a color space whose axis variables are represented by basic colors.

6. The profile creation method as claimed in claim 5, wherein
regarding colorimetric values to be corrected in the same sequential order at the step (b), correction is preferentially performed on an array of colors where a value of a basic color whose monochromatic solid image has lower brightness gradually changes compared to brightness of respective monochromatic solid images of other basic colors of the array of colors.

7. The profile creation method as claimed in claim 1, wherein the degree of color variation determined about the previously accumulated colorimetric values of patch images corresponding to the one patch image is a degree of variation in read colorimetric values of the patch images corresponding to the one patch image.

8. The profile creation method as claimed in claim 1, wherein the color chart and the plurality of previously printed color charts are outputted from a single printer.

9. The profile creation method as claimed in claim 1, wherein the color chart and the plurality of previously printed color charts are outputted from a plurality of printers.

10. A non-transitory computer readable recording medium stored with a profile creation program for creating a color conversion profile for a printer by causing the printer to output a color chart including a plurality of patch images, the program causing a computer to execute a process comprising the steps of:
(a) acquiring a colorimetric value of one patch image included in the color chart output by the printer; and
(b) correcting the colorimetric value of the one patch image acquired at the step (a) based on a degree of variation determined about previously accumulated colorimetric values of patch images corresponding to the one patch image, each of the patch images being a patch image of a respective one of a plurality of previously printed color charts, wherein
the step (a) and the step (b) are executed for each patch image of the plurality of patch images included in the color chart.

11. The non-transitory computer readable recording medium as claimed in claim 10, wherein at the step (b), the colorimetric value acquired at the step (a) is corrected by calculating a weighted average value between the colorimetric value and an approximate value calculated from colorimetric values of a plurality of other patch images included in the color chart; and
a weighting factor in the calculation of the weighted average value is changed according to the degree of the variation so that as the degree of the variation is larger, a weight of the approximate value becomes larger.

12. The non-transitory computer readable recording medium as claimed in claim 11, wherein
a number of the other patch images is changed according to the degree of the variation so that as the degree of the variation is larger, the number of the other patch images used for the calculation of the approximate values increases.

13. The non-transitory computer readable recording medium as claimed in claim 10, wherein
the process further comprises, before the step (b):
(c) calculating, from the previously accumulated colorimetric values, standard deviations of L* value, a* value, and b* value of the previously accumulated colorimetric values in an L*a*b* color system; and
(d) specifying the degree of the variation on the basis of the standard deviations calculated at the step (c).

14. The non-transitory computer readable recording medium as claimed in claim 10, wherein
at the step (b), colorimetric values of the plurality of patch images are corrected in a sequential order of colorimetric values of colors corresponding to vertices, colorimetric values of colors corresponding to ridgelines, colorimetric values of colors corresponding to a surface other than the ridgelines, and colorimetric values of colors corresponding to an inside of a color space whose axis variables are represented by basic colors.

15. The non-transitory computer readable recording medium as claimed in claim 14, wherein
regarding colorimetric values to be corrected in the same sequential order at the step (b), correction is preferentially performed on an array of colors where a value of a basic color whose monochromatic solid image has lower brightness gradually changes compared to brightness of respective monochromatic solid images of other basic colors of the array of colors.

16. The non-transitory computer readable recording medium as claimed in claim 10, wherein the degree of variation determined about the previously accumulated colorimetric values of patch images corresponding to the one patch image is a degree of variation in read colorimetric values of the patch images corresponding to the one patch image.

17. The non-transitory computer readable recording medium as claimed in claim 10, wherein the color chart and the plurality of previously printed color charts are outputted from a single printer.

18. The non-transitory computer readable recording medium as claimed in claim 10, wherein the color chart and the plurality of previously printed color charts are outputted from a plurality of printer.

* * * * *